(12) United States Patent
Norrell et al.

(10) Patent No.: US 6,690,666 B1
(45) Date of Patent: Feb. 10, 2004

(54) PACKET MODULATION FOR DSL

(75) Inventors: Andrew L. Norrell, Nevada City, CA (US); Dale M. Walsh, Golf, IL (US); William Kurt Dobson, Sandy, UT (US); Richard G. C. Williams, San Diego, CA (US); John Rosenlof, LaMesa, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/322,888

(22) Filed: May 29, 1999

(51) Int. Cl.[7] ............................................. H04L 12/50
(52) U.S. Cl. ................. 370/386; 375/346; 379/406.01; 379/417
(58) Field of Search ................... 370/447, 286–289, 370/292, 406.1, 252, 201; 379/406.12, 406.01, 414, 417; 375/257, 222, 220, 346, 285, 231, 260

(56) References Cited

U.S. PATENT DOCUMENTS

| 5,887,032 | A | * | 3/1999 | Cioffi .......................... 375/257 |
| 6,222,851 | B1 | * | 4/2001 | Petry .......................... 370/447 |
| 6,377,683 | B1 | * | 4/2002 | Dobson et al. ........ 379/406.12 |

* cited by examiner

Primary Examiner—John Pezzlo
(74) Attorney, Agent, or Firm—McDonnell Boehnen Hulbert & Berghoff

(57) ABSTRACT

The subject invention defines the details of packet based DSL modulation. The invention claims a method for minimizing crosstalk generation by specifying a duty cycle for bursted carrier data traffic and a method of providing opportunistic echo canceller training. In this way the present invention minimizes power and interference while maximizing the peak capacity of a transceiver used in ADSL communication systems.

6 Claims, 5 Drawing Sheets

PACKET MODULATION FOR DSL

FIELD OF INVENTION

The present invention relates to communications in computer networks. More specifically, it relates to transmission techniques used in digital subscriber loop modem technology.

BACKGROUND OF THE INVENTION

A. Description of the Related Art

1. Asymmetric Digital Subscriber Lines

Asymmetric Digital Subscriber Line (ADSL) is a communication system that operates over existing twisted-pair telephone lines between a central office and a residential or business location. It is generally a point-to-point connection between two dedicated devices, as opposed to multi-point, where numerous devices share the same physical medium.

ADSL supports bit transmission rates of up to approximately 6 Mbps in the downstream direction (to a subscriber device at the home), but only 640 Kbps in the upstream direction (to the service provider/central office). ADSL connections actually have three separate information channels: two data channels and a POTS channel. The first data channel is a high-speed downstream channel used to convey information to the subscriber. Its data rate is adaptable and ranges from 1.5 to 6.1 Mbps. The second data channel is a medium speed duplex channel providing bi-directional communication between the subscriber and the service provider/central office. Its rate is also adaptable and the rates range from 16 to 640 kbps. The third information channel is a POTS (Plain Old Telephone Service) channel. The POTS channel is typically not processed directly by the ADSL modems—the POTS channel operates in the standard POTS frequency range and is processed by standard POTS devices after being split from the ADSL signal.

The American National Standards Institute (ANSI) Standard T1.413, the contents of which are incorporated herein by reference, specifies an ADSL standard that is widely followed in the telecommunications industry. The ADSL standard specifies a modulation technique known as Discrete Multi-Tone modulation.

2. Discrete Multi-Tone Modulation

Discrete Multi-Tone (DMT) uses a large number of subcarriers spaced close together. Each subcarrier is modulated using a type of Quadrature Amplitude Modulation (QAM). Alternative types of modulation include Multiple Phase Shift Keying (MPSK), including BPSK and QPSK, and Differential Phase Shift Keying (DPSK). The data bits are mapped to a series of symbols in the I-Q complex plane, and each symbol is used to modulate the amplitude and phase of one of the multiple tones, or carriers. The symbols are used to specify the magnitude and phase of a subcarrier, where each subcarrier frequency corresponds to the center frequency of the " bin" associated with a Discrete Fourier Transform (DFT). The modulated time-domain signal corresponding to all of the subcarriers can then be generated in parallel by the use of well-known DFT algorithm called Inverse Fast Fourier Transforms (IFFT).

The symbol period is relatively long compared to single carrier systems because the bandwidth available to each carrier is restricted. However, a large number of symbols is transmitted simultaneously, one on each subcarrier. The number of discrete signal points that may be distinguished on a single carrier is a function of the noise level. Thus, the signal set, or constellation, of each subcarrier is determined based on the noise level within the relevant subcarrier frequency band.

Because the symbol time is relatively long and follows a guard band, intersymbol interference is a less severe problem than with single carrier, high symbol rate systems. Furthermore, because each carrier has a narrow bandwidth, the channel impulse response is relatively flat across each subcarrier frequency band. The DMT standard for ADSL, ANSI T1.413, specifies 256 subcarriers, each with a 4 kHz bandwidth. Each sub-carrier can be independently modulated from zero to a maximum of 15 bits/sec/Hz. This allows up to 60 kbps per tone. DMT transmission allows modulation and coding techniques to be employed independently for each of the sub-channels.

The sub-channels overlap spectrally, but as a consequence of the orthogonality of the transform, if the distortion in the channel is mild relative to the bandwidth of a sub-channel, the data in each sub-channel can be demodulated with a small amount of interference from the other sub-channels. For high-speed wide-band applications, it is common to use a cyclic-prefix at the beginning, or a periodic extension at the end of each symbol, in order to maintain orthogonality.

The DSL modulation technique described above is a constant carrier and is not designed for multi-point media. The architects of DSL services assume an "always available" model. This translates into "always on" service, which leads designers to select constant carrier modulation—that is, constant line power, regardless of data traffic. Most of the time, DSL transceivers send idle packets. This maximizes energy consumption, rfi, crosstalk, etc. without corresponding benefit. In comparison, multi-point systems use switched carrier methods to accommodate multiple transmitters on the shared medium. Transmitters turn on carriers when required and are otherwise silent. Switched carrier mode tends to minimize energy consumption, as well as radio frequency interference and cross talk.

3. Frequency Domain Equalization

In standard DMT modulation, each N-sample encoded symbol is prefixed with a cyclic extension to allow signal recovery using the cyclic convolution property of the discrete Fourier transform (DFT). Of course, the extension may be appended to the end of the signal as well. If the length of the cyclic prefix, L, is greater than or equal to the length of the impulse response, the linear convolution of the transmitted signal with the channel becomes equivalent to circular convolution (disregarding the prefix). The frequency indexed DFT output sub-symbols are merely scaled in magnitude and rotated in phase from their respective encoded values by the circular convolution. It has been shown that if the channel impulse response is shorter than the length of the periodic extension, sub-channel isolation is achieved. Thus, the original symbols can then be recovered by transforming the received time domain signal to the frequency domain using the DFT, and performing equalization using a bank of single tap frequency domain equalizer (FEQ) filters. The FEQ effectively deconvolves (circularly) the signal from the transmission channel response. This normalizes the DFT coefficients allowing uniform QAM decoding.

Such an FEQ is shown in FIG. 1. The FFT calculator 20 accepts received time domain signals from line 10, and converts them to frequency domain representations of the symbols. Each frequency bin (or output) of the FFT 20 corresponds to the magnitude and phase of the carrier at the corresponding frequency. In FIG. 1, each bin therefore contains a separate symbol value X(i) for the $i^{th}$ carrier. The frequency domain equalizer FEQ 40 then operates on each of the FFT 20 outputs with a single-tap filter to generate the equalized symbol values X'(i). The FEQ 40 inverts the residual frequency response of the effective channel by a single complex multiplication. The FEQ outputs are then decoded by a slicer, or data decision device (not shown). The FEQ taps can be updated, and can make use of the slicer output. That is, the FEQ taps may be updated so as to minimize the error between the FEQ output and the slicer output. This is commonly referred to as decision feedback equalization, or decision-directed adaptation.

Equalization in packet based DSL modulation has certain advantages over this prior art. In the prior art, some channels contain nulls or near nulls, and are difficult to equalize. This is especially true when the equalizer solution is supposed to remain stable for long periods. These problematic spectral features are less significant when the equalizer solution need only be designed to last for a short period. The transmitter gating function is a time domain pulse that looks like a sinc function in the frequency domain. The convolution of this sinc function with the channel yields an apparent channel with shallower nulls. The equalizer faces a less severe problem. The packets can be constructed for some maximum length that makes short term equalization easy and timing drift tolerable. Of course, there is a preamble penalty in a packet based system—there is at least some training preamble in every packet, which reduces the peak data throughput somewhat, though the statistical crosstalk savings may more than compensate for it.

4. Timing Recovery

Also shown in FIG. 1 is a clock recovery and control circuit 30. The clock recovery circuit 30 analyzes the pilot tone that is embedded in the transmitted DMT signal in ADSL communication systems. Timing recovery normally increases receiver hardware and software complexity and may require some spectral allocation, depending on type of modulation or coding.

A typical hardware solution is shown in FIG. 2. The clock recovery components are indicated with dashed lines. Control words from a clock recovery algorithm running in a DSP 10 are converted to voltage levels by a digital-to-analog converter (DAC) 12 which controls the receive sampling rate of an ADC 14 through a voltage-controlled oscillator (VCO) 16. With a pure software timing recovery solution, the DAC 12 and VCO 16 (marked in dotted line) and any associated circuitry can be eliminated. A crystal at the nominal frequency would provide the ADC 14 sample clock.

Timing information may also be recovered using software techniques. One known method of implementing software clock recovery is to digitally resample the received signal at the transmitter's clock rate by interpolating the received samples. FIG. 3 is block diagram showing an input signal being applied to an interpolator 12, the output of which is applied to a clock recovery algorithm 22 executing on a processor. The interpolation may be performed by clock recovery.

This is a general method and may be used to recover clock for any type of synchronous modulation but may differ in the way the transmit clock is extracted from the received signal. For DMT, one of the frequency bins output from a fast Fourier transform (FFT) function is usually dedicated as a pilot tone. The clock recovery algorithm executing in a processor includes a filter to isolate the pilot tone and logic to estimate the clock offset between transmitter and receiver and to control the resampling rate in an interpolator.

The interpolation stage can be implemented a number of ways, but it generally consists of integrally interpolating receive samples to a rate (k) several times the nominal rate and then fractionally interpolating between two or more high rate samples using polynomial interpolation. Decimation to the final rate is accomplished by skipping over (not computing) samples and by computing only those samples needed to fractionally interpolate to the final rate. The interpolation rate (k) and the order of the polynomial used in the fractional interpolation can be traded off for a particular implementation in order to minimize complexity and provide tolerable interpolation error. Because this method can require tens of processor cycles for each interpolated sample it is not preferred for modems operating at high sample rates.

Because ADSL and other DMT modems are high-speed high bandwidth communication devices, they generally rely heavily on hardware solutions timing recovery solutions. As modem technologies mature, often the most important differentiator between one modem manufacture and the next is cost. One way to reduce cost is to reduce the hardware complexity of a modem. Cost savings can be significant for very high-speed modems with sample rates in the range of hundreds of kilohertz to several megahertz because of the premium placed on high-speed components. Of course, a software solution takes processor resources, which also has a cost, but processors tend to have steep development curves and newer versions are regularly introduced with increased capability and lower cost.

In contrast to the prior art, a packet-based system may not require any tracking timing recovery scheme, depending on the accuracy of the timing references and the packet length. In some cases, expensive hardware functions, like the VCO, can be eliminated altogether. Additionally, the spectral allocation, if any, can be reduced or eliminated.

SUMMARY OF THE INVENTION

In accordance with preferred embodiments of the present invention, some of the problems associated with constant carrier DSL modulation are overcome. The subject invention defines the details of packet based DSL modulation. One aspect of the invention includes a method for minimizing energy consumption, radio frequency interference, and ensemble crosstalk generation by specifying a duty cycle for bursted carrier data traffic. It is also a purpose of this invention to simplify equalization and timing recovery while also providing opportunistic echo canceller training.

The foregoing and other features and advantages of a preferred embodiment of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

Figure 1:
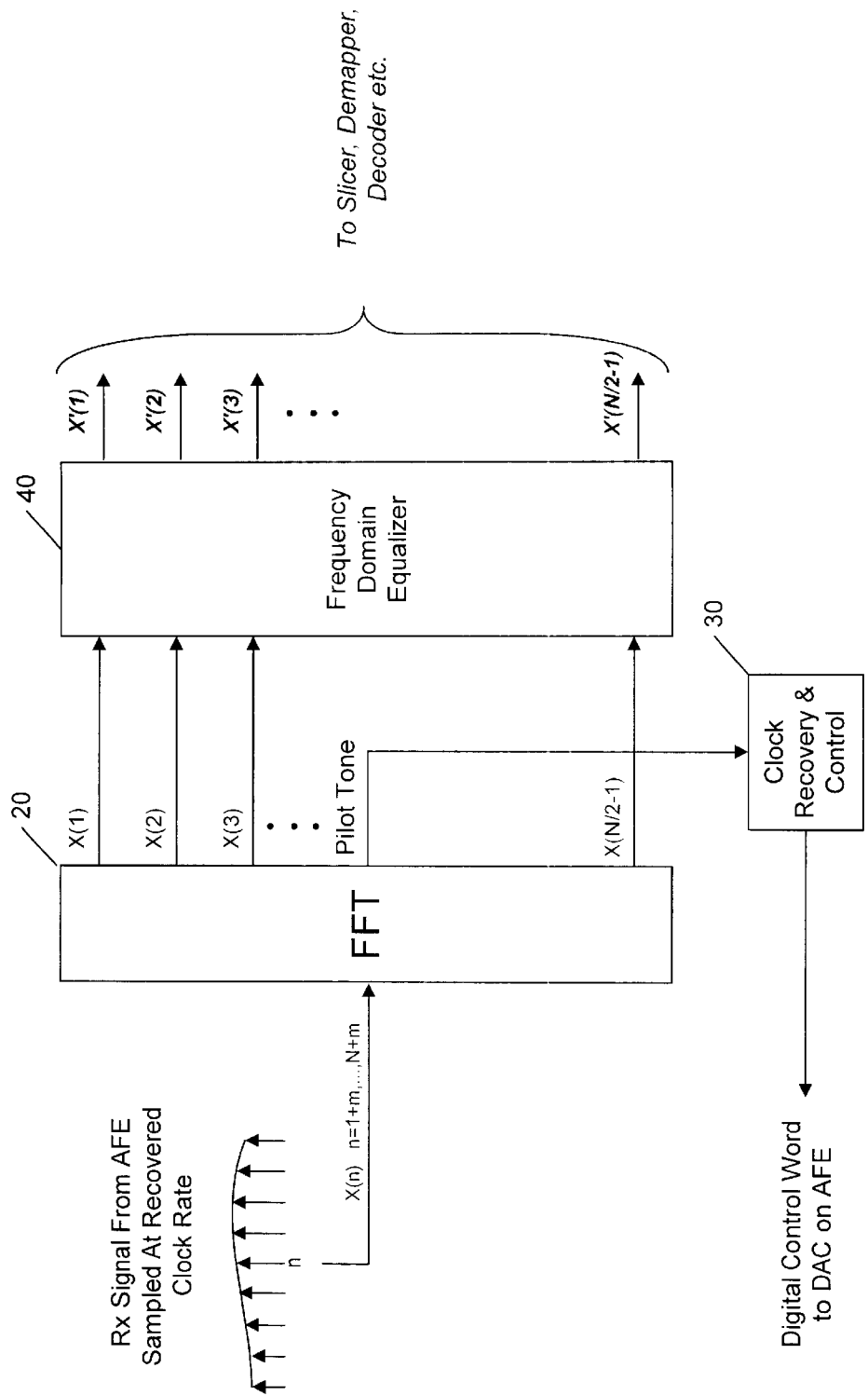
FIG. 1 depicts a prior art frequency domain equalizer.
Figure 2:
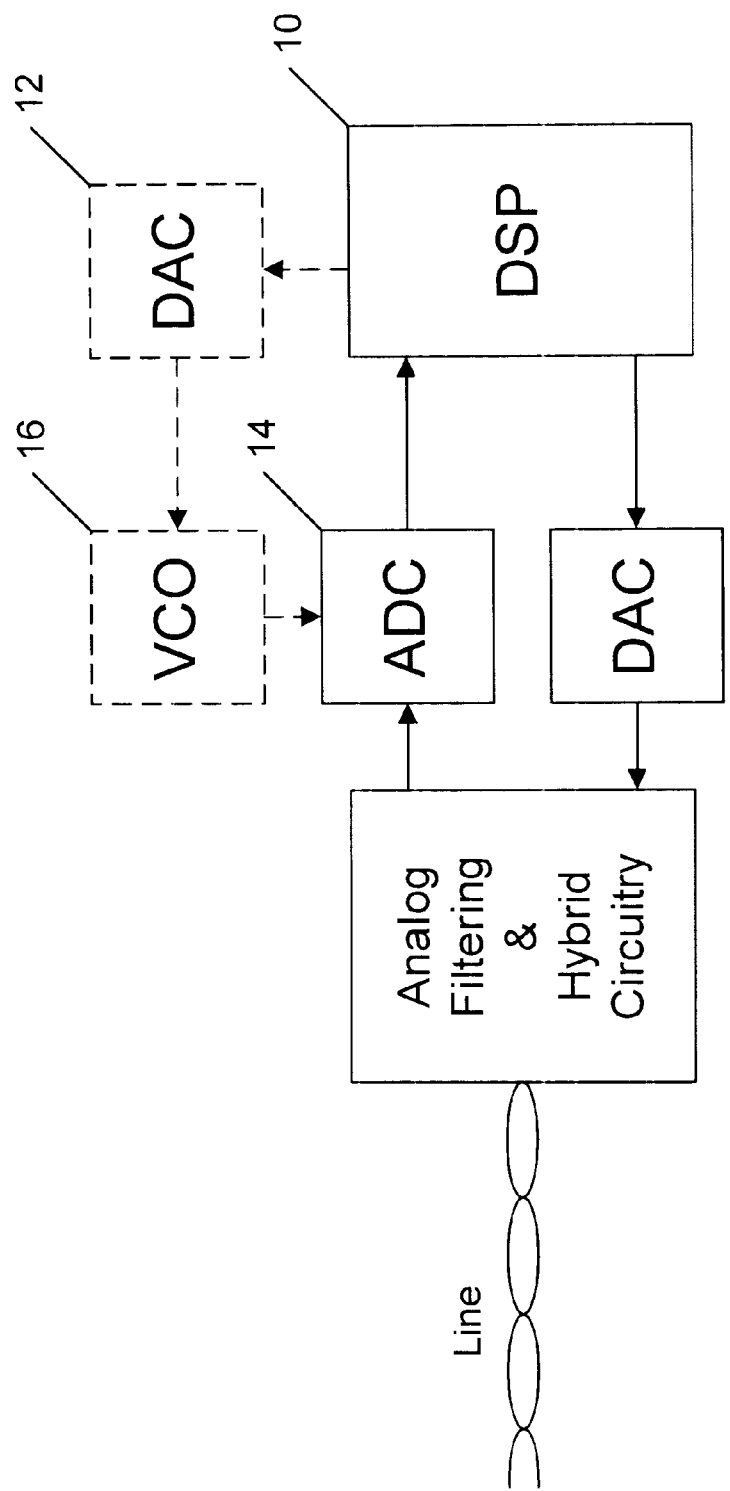
FIG. 2 shows the decision feedback frequency domain equalizer.
Figure 3:
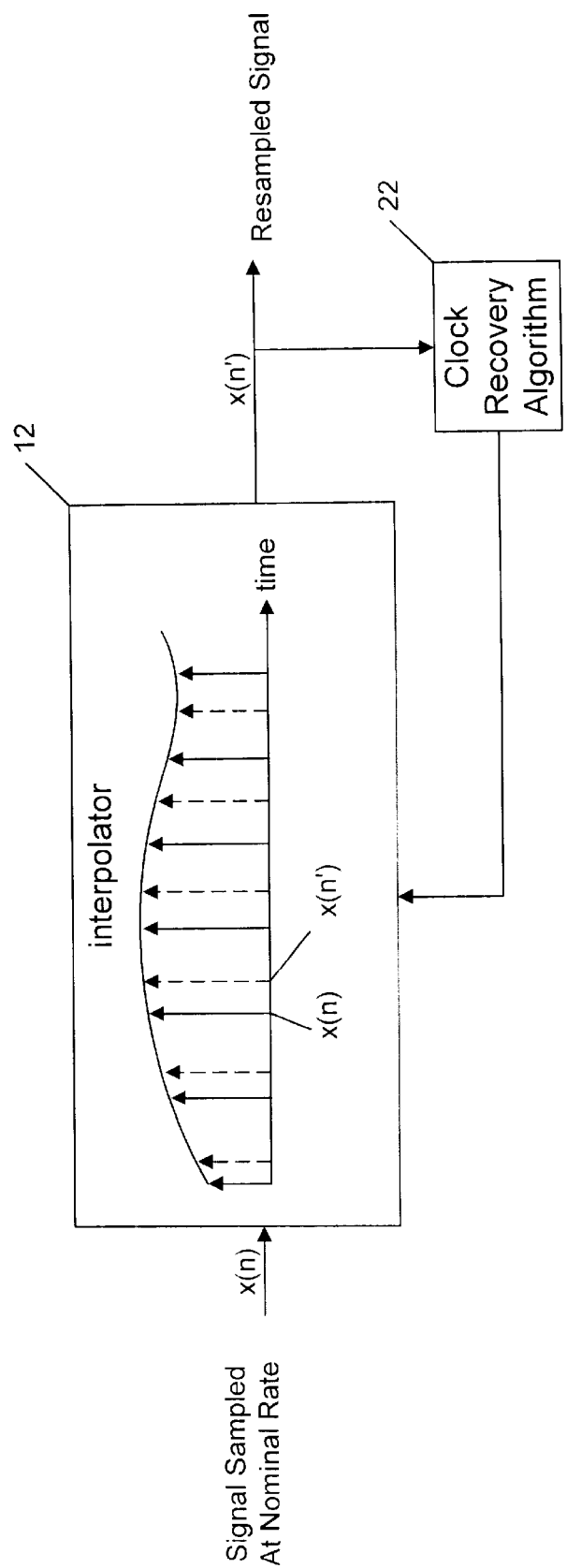
FIG. 3 shows a flowchart of the equalization methods disclosed herein.
Figure 4:
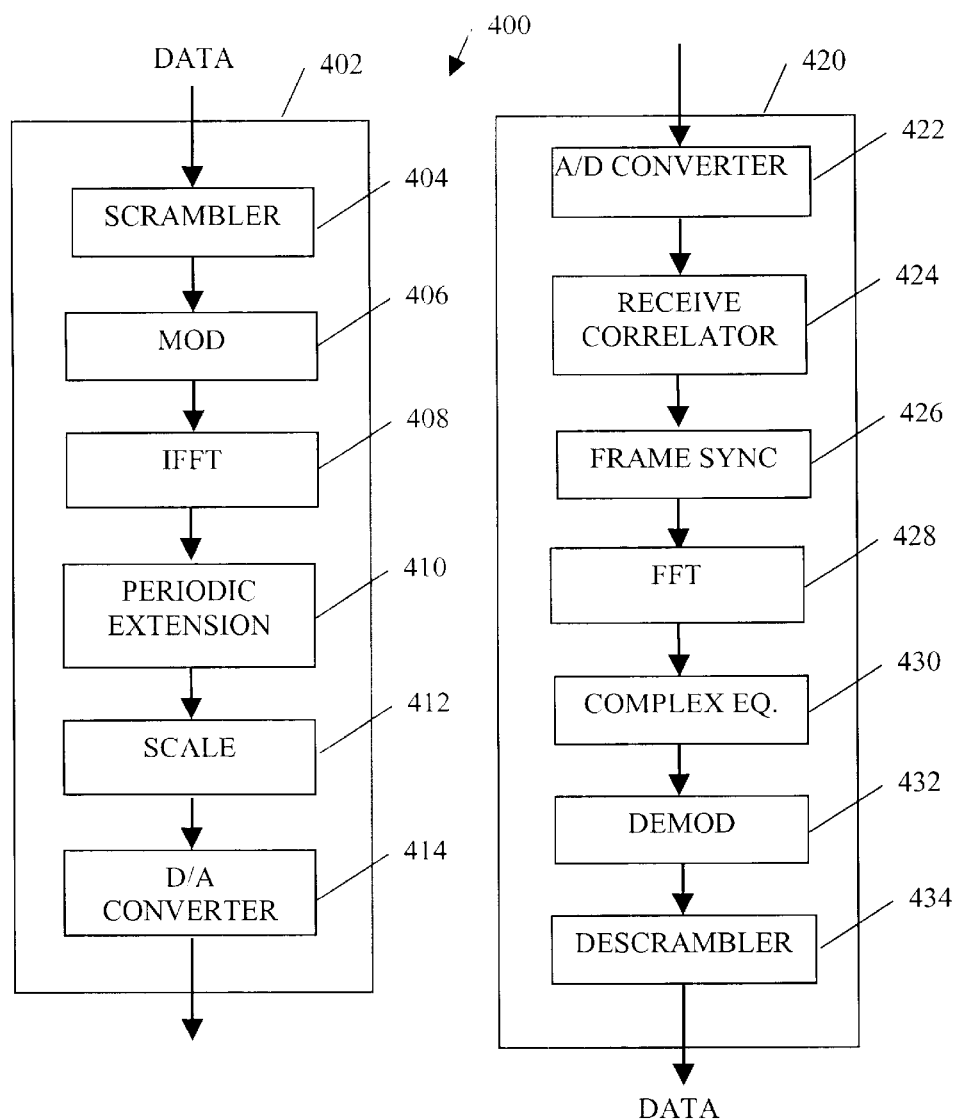
FIG. 4 depicts a block diagram of a transceiver.

As shown in FIG. 4, a transceiver 400 includes a transmitter 402 and receiver 420 for transmitting and receiving data on a number of predetermined frequency ranges over a local LAN to and from any devices. The MOD modulator block 406 maps input data to complex points in a signal constellation for each sub-channel. In the prior art, Quadrature Amplitude Modulation (QAM), Multiple Phase Shift Keying (MPSK) (including QPSK), Differential Phase Shift Keying (DPSK) (including DQPSK) and the like were all possible modulation schemes. The preferred embodiment of the claimed invention replaces these modulation schemes with packet modulation. Packet modulation is designed for multi-point communications over a shared two-wire medium—existing internal home wiring. One transmitter talks at a time, except for collisions, which are resolved by protocol, and all receivers are assumed able to hear all transmitters, so that any transmitted packet is received and understood by the appropriate receiver.

The multi-point DMT receiver is designed to receive each packet assuming it is from an unknown source. No assumption is made about the identity of the transmitter or the specific channel characteristics. The receiver design requires good dynamic response—fast timing acquisition, carrier level, and equalization. The need for switched carrier is very clear in multi-point, since the alternative would be a permanent collision condition. Another advantage of packet modulation is that each packet is designed as a standalone data unit, with an imbedded checksum. A corrupted packet will, with high probability, have a corrupt checksum. The receiver can request retransmission of the packet. This low-layer guaranteed delivery mechanism is an advantage for latency-sensitive data, such as telephony.

Echo cancellation is an enhancement to this scheme. Echo cancellation is a technique that allows two transceivers (in a point-to-point configuration) to transmit simultaneously using the same bandwidth. The technique works as follows: the receiver receives the combination of two signals: the remote transmitter convolved with the transmission channel and the local transmitter convolved with the local echo channel. This later signal is known as local echo. The echo canceler is a predictor that accepts the local transmits signals as input, and generates an estimate of the local echo. This estimate is subtracted from the composite received signal; prior to demodulation. If the estimate is accurate enough, the receive process in unaware of the local transmitter, and the two directions of transmission are truly independent. This technique will roughly double the capacity of a channel compared to other techniques.

Multi-point systems often rely on some sort of collision detection and contention resolution to facilitate sharing of the medium. Such systems may rely on the simultaneous detection of any collision by all receivers. Echo cancellation is not a useful technique in these systems, because the local receiver cannot see its associated transmitter.

Echo cancellation can require considerable time to train parameters to a high degree of accuracy. This problem can limit the usefulness in switched carrier applications where the training time can be as long as a typical packet burst. This can reduce effective throughput to that of a non-echo canceled system. This training problem can be solved by active transmission of silence during periods when the carrier is turned off. The predictor then accurately predicts silence as well as signal at the appropriate times. Thus the transmitter isn't really turned on and off, but rather the power is varied from nominal during packet transmission to essentially zero during "silence". The echo canceler works seamlessly when the transmitter changes state, assuming that there is no change in echo channel, and no training is required other than the initial training period and possible touch-up periods if the canceler is detuned by circuit or channel changes.

Figure 5:
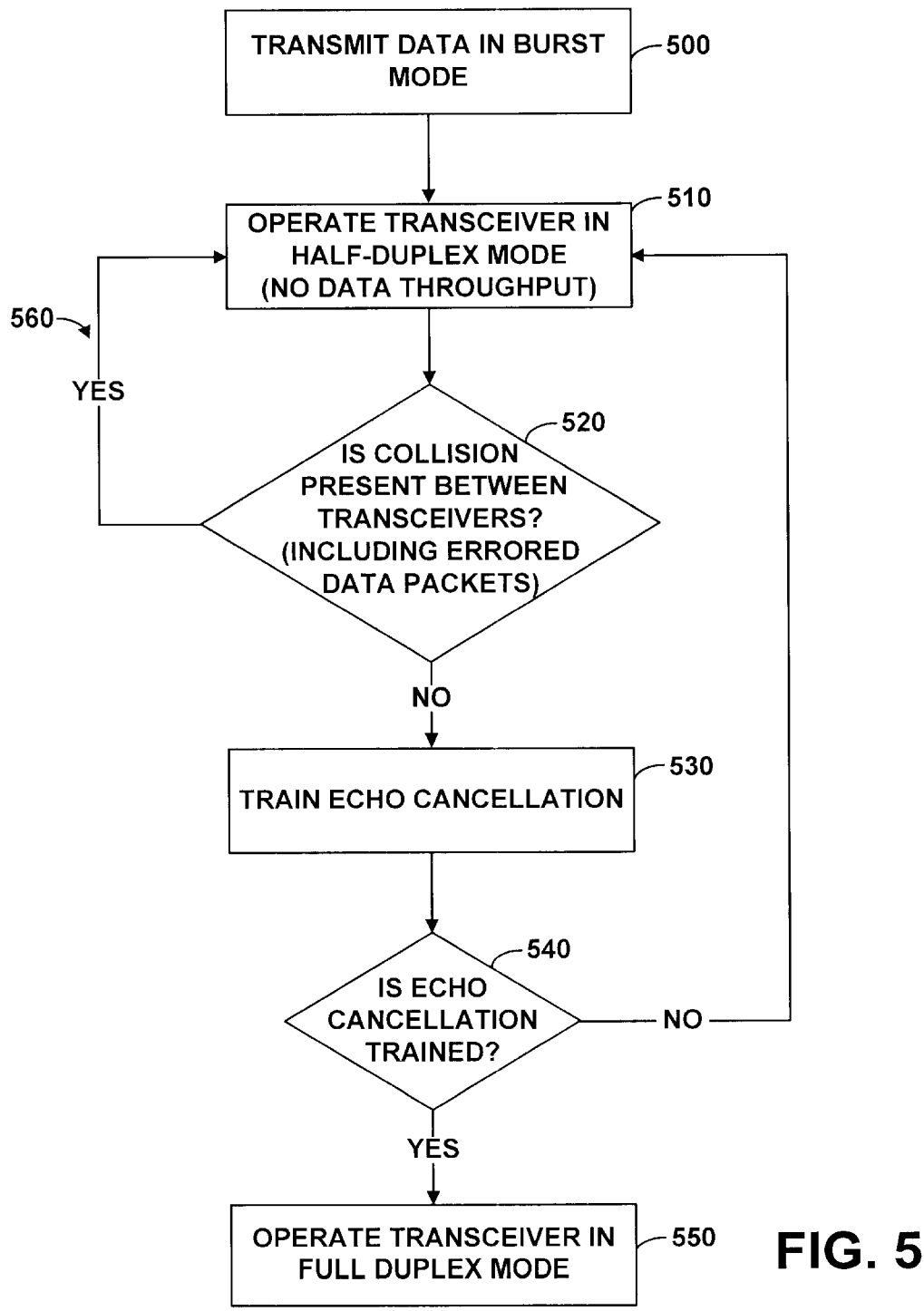
FIG. 5 shows a flow chart of the echo canceller training feature of the present invention.

FIG. 5 shows a flow chart of the echo canceller training feature of the present invention. When data packets are being transmitted in burst mode 500, echo cancellers are usually trained 530 during special half-duplex periods 510. During these periods, there is no data throughput. This is unnecessary in packet based DSL (PDSL). The echo canceler can be trained opportunistically whenever there is no collision between transmitters 530. If a collision is detected, the update is skipped 560. This allows a pair of transceivers to start out half-duplex 510, and gradually converge to full-duplex status 550 when fully trained 540. The echo cancelers can also track using the same technique, without the usual difficulties of tracking during doubletalk.

In addition to training echo cancellers. PDSL can also be used to reduce crosstalk levels. The benefits of switched carrier modulation are immediately apparent in a point-to-point subscriber loop link if the capacity is crosstalk limited by the same service. The crosstalk level for all subscribers in a cable bundle will drop if all transceivers switch off carriers during idle periods. This means that the peak capacity of any transceiver pair will increase with decreasing average duty cycle of all transmitters in the same bundle:

TABLE 1

Relationship between average duty cycle and peak capacity.

| % Duty Cycle | Xtalk/Tx power reduction, dB | Peak capacity gain, bits/Hz |
| --- | --- | --- |
| 100 | 0.0 | 0 |
| 75 | 1.25 | .416 |
| 50 | 3.01 | 1 |
| 25 | 6.02 | 2 |
| 10 | 10.0 | 3.32 |
| 5 | 13.01 | 4.32 |
| 2 | 17.0 | 5.64 |
| 1 | 20.0 | 6.65 |

Thus, PDSL is a powerful technique for subscriber loop transmission. This technique can minimize power and interference, while maximizing peak capacity. Peak capacity can be further enhanced by another factor—performance margin. Current "always on" DSL techniques require as much as 6 dB of "back-off" from operating limits of the channel to maintain low error rate when channel characteristics change significantly, or there is an unusual interference event. PDSL can be designed to treat errored packets as "collisions", which are handled by low layers with low latency. Depending on latency tolerance, the operating performance margin can be reduced or eliminated, further increasing capacity relative to "always on" DSL techniques.

There is another way to capitalize on PDSL on noise limited channels. The transmitter can tradeoff between transmit power level and carrier on duty cycle to achieve data throughput on noise limited channels while still observing the average power constraint.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the Steps of the flow diagrams may be taken in sequences other than those described, and more or fewer elements or components may be used in the block diagrams. In addition, the present invention can be practiced with software, hardware, or a combination thereof.

The claims should not be read as limited to the described order or elements unless stated to that effect. Therefore, all embodiments that come within the scope and spirit of the following claims and equivalents thereto are claimed as the invention.

We claim:

1. A method of reducing cross talk communication over twisted-pair telephone lines between a central office and a subscriber by a plurality of transceivers comprising the steps of:

determining at least one crosstalk reduction factor at the central office;

calculating a duty cycle in response to the reduction factor; and conveying a duty cycle to all transceivers in a cable bundle.

2. A method of reducing cross talk communication over twisted-pair telephone lines between a central office and a subscriber by a plurality of transceivers comprising the steps of:

determining a plurality of crosstalk reduction factors at the central office;

calculating duty cycles in response to each reduction factor; and conveying each duty cycle to individual transceivers in a cable bundle based on a level of service selected by the subscriber.

3. A method of reducing cross talk communication over twisted-pair telephone lines between a central office and a subscriber by a plurality of transceivers in accordance with claim 2, further comprising the steps of:

transmitting a multi-carrier data signal in burst mode;

operating transceivers in half-duplex mode;

training an echo canceller while in half duplex mode;

transmitting in full-duplex mode thereafter.

4. A method of reducing cross talk communication over twisted-pair telephone lines between a central office and a subscriber by a plurality of transceivers in accordance with claim 3 wherein there is no data throughput during half-duplex periods.

5. A method of reducing cross talk communication over twisted-pair telephone lines between a central office and a subscriber by a plurality of transceivers in accordance with claim 3 wherein the echo canceller is trained whenever there is no collision between transmitters and if a collision is detected, the training is skipped.

6. A method of reducing cross talk communication over twisted-pair telephone lines between a central office and a subscriber by a plurality of transceivers in accordance with claim 5 wherein collisions include errored data packets.

* * * * *